Figure 1:
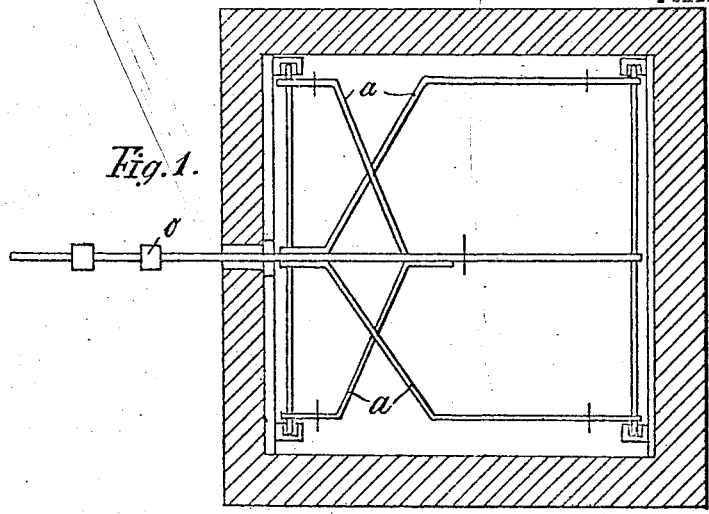

J. ELSNER & C. GUTTWEIN.
APPARATUS FOR DRYING GREEN MALT.
APPLICATION FILED JAN. 25, 1907.

899,037.

Patented Sept. 22, 1908.
2 SHEETS—SHEET 1.

WITNESSES
W. P. Burke
W. J. Smith

INVENTORS
Joseph Elsner
Curt Guttwein

J. ELSNER & C. GUTTWEIN.
APPARATUS FOR DRYING GREEN MALT.
APPLICATION FILED JAN. 25, 1907.
899,037.
Patented Sept. 22, 1908.
2 SHEETS—SHEET 2.
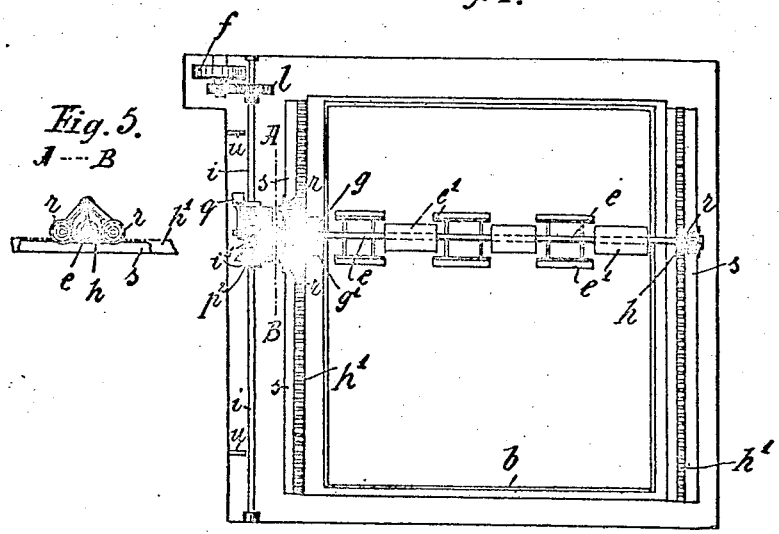
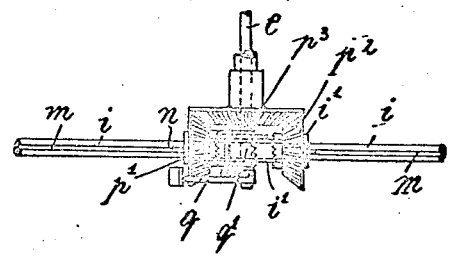
WITNESSES
INVENTORS

UNITED STATES PATENT OFFICE.

JOSEPH ELSNER, OF BERLIN, AND CURT GUTTWEIN, OF ASCHERSLEBEN, GERMANY.

APPARATUS FOR DRYING GREEN MALT.

No. 899,037.  Specification of Letters Patent.  Patented Sept. 22, 1908.

Application filed January 25, 1907. Serial No. 354,146.

*To all whom it may concern:*

Be it known that we, JOSEPH ELSNER and CURT GUTTWEIN, subjects of Germany, residing at Berlin and Aschersleben, Germany, have invented new and useful Improvements in Apparatus for Drying Green Malt, of which the following is a specification.

When drying green malt it is of great importance that the process of withdrawing the water should be watched step by step. Whether the beer is a success or not, depends very often on the manner in which the drying of the green malt is conducted, since upon this the quality, color and taste of the resulting beer greatly depend.

For want of better means the drying method has hitherto been conducted merely on the basis of practical experience, according to the appearance and the feel of the malt; but with such method even the most experienced malster is in a difficult position. The green malt, according to the quality of the barley and the treatment which it undergoes upon the malt floor, has a varying amount of water and different qualities, which—even when the other conditions are the same—make it necessary that a different course for the withdrawal of water should be taken. It has been found from experience that already during the first half of the process, the water must be withdrawn in a certain time and at certain temperatures, in order to obtain from a well-dissolved green malt a beer always uniform in taste and color. The character of the beer chiefly depends on the enzymotic and chemical processes which accompany the drying process. These processes depend on the moisture in the malt and on the temperature; they are also of very great importance for the subsequent roasting process. The whole drying process therefore must be accurately determined and after it has been proven to be correct, it must be strictly adhered to. In order to do this, it is however necessary that not only the temperature and time should always be known—for there are ample means to ascertain these—but also at all times the degree to which the water has been expelled.

The present invention solves the problem by continually or periodically weighing the material to be handled, thus making the changes of weight constantly known to the operator and enabling him to influence the process if necessary.

According to our invention, the malt trough is arranged upon a weighing machine or combined with such, so that, providing the material is weighed before the commencement of the drying, the quantity of water withdrawn is ascertained after a certain time by weighing again. It is of no importance whether an ordinary machine with fixed scales or sliding weights, a deflecting or spring balance, hydrostatical balance or the like is used. The weight for the handled material before the drying process may be reduced by the amount corresponding with the weight of a certain quantity of water, so that a balancing of the scales will indicate the loss of such an amount of water.

An apparatus constructed in accordance with our invention is shown in the accompanying drawings, in which—

Figure 2:
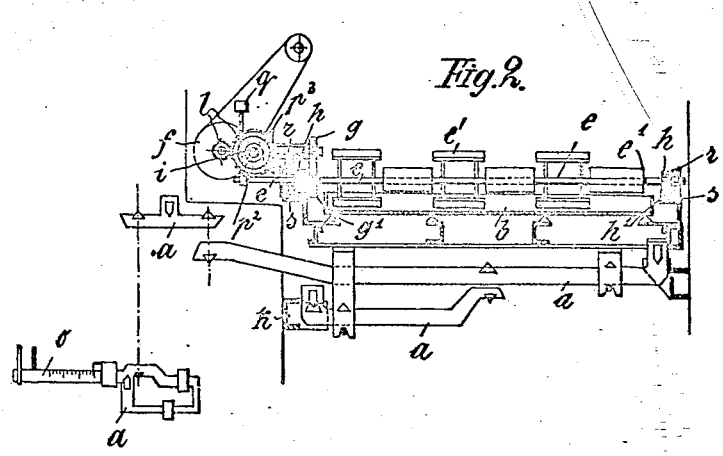
Figure 3:
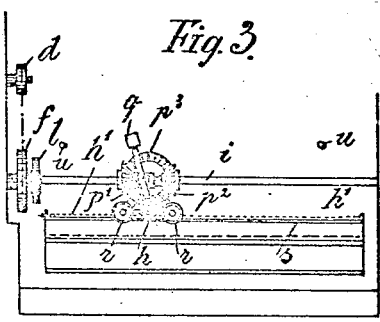

Figure 1 is a plan, Fig. 2 a longitudinal section, and Fig. 3 a cross section of the plant. Fig. 4 is a plan view and Figs. 5 and 6 are details.

A trough, $b$, rests on the bridge levers, $a$, of the weighing machine. The turner or stirrer, $e$, driven by the electric motor, $d$, turns the material in the trough, e. g., the green malt. The turning and traveling movement of the actual turner, $e$, is controlled in well-known manner by the pulley, $f$, the gearing, $g$, $g'$, and the racks, $h$, and $h'$. The two beams, $k$ and $k'$, resting against the wall of the drying chamber, serve as supports for the weighing machine. There is also a clearance around the machine so that the scales may play freely. The mechanism for the sliding weight, $o$, shown dotted in Fig. 3, is best arranged outside the drying chamber, for instance in the heating chamber below.

The method of working the plant for drying green malt is as follows: After the trough, $d$, has been charged with green malt, the amount of water in the latter is ascertained in the ordinary manner with the aid of suitable apparatus. Supposing the charge weighs 1,500 kilograms and the water in the same amounts to 30%, there are then 1,050 kilograms of dry substance and 450 kilograms of water contained in the charge. If it is intended to decrease the amount of water in the malt after the first hour by a certain percentage, say by 5%, so that the quantity of water will then amount to 25% only, which is equivalent to a total weight of 1,400 kilograms, the weighing machine can be adjusted to balance of load of 1,400 kilograms.

If after the expiration of an hour the scale is balanced, this will serve as a proof, that the dampers for the ventilation, and the like, were adjusted properly. Otherwise the adjustment was incorrect and must be altered accordingly. If the amount of water is to be reduced to 20% after the expiration of the second hour, the counterpoise must be 1312.5 kilograms, and if the scales balance again after the expiration of the time, the position of the dampers is correct and the method of withdrawing the moisture properly conducted. This is continued until the amount of water is reduced to the desired percentage. It is evident that the periods may be shortened or lengthened. In this manner it is always possible to produce malt of a certain quality, without having to depend on guess-work only. Any unskilled laborer will soon be able to work such a malt kiln, and the result will be more reliable than has hitherto been the case, since the processes which the malt has to undergo are under absolute control.

Having thus described our invention, we declare that what we claim is:

Apparatus for weighing green malt in the course of drying, comprising a weighing machine, a malt receptacle carried by the same, traveling, rotary malt agitating means located in the receptacle, and means for driving the same, substantially as described.

In testimony whereof we have signed our names to this specification in the presence of two subscribing witnesses.

JOSEPH ELSNER.
CURT GUTTWEIN.

Witnesses as to Joseph Elsner:
WOLDEMAR HAUPT,
HENRY HASPER.

Witnesses as to Curt Guttwein:
RUDOLPH FRICKER,
SOUTHARD P. WARNER.